(12) United States Patent
Görlich et al.

(10) Patent No.: US 9,348,093 B2
(45) Date of Patent: May 24, 2016

(54) DISPLAY ELEMENT FOR AN ELECTRONIC MODULE AND ELECTRONIC MODULE

(71) Applicant: Siemens Aktiengesellschaft, Munich (DE)

(72) Inventors: Stefan Görlich, Illschwang (DE); Mariya Kutsovska, Ingolstadt (DE); Alexander Reinhard, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/604,906

(22) Filed: Jan. 26, 2015

(65) Prior Publication Data

US 2015/0212276 A1 Jul. 30, 2015

(30) Foreign Application Priority Data

Jan. 27, 2014 (EP) .................................. 14152649

(51) Int. Cl.
*G02B 6/36* (2006.01)
*G09F 13/18* (2006.01)
*G09F 23/00* (2006.01)

(52) U.S. Cl.
CPC ........ *G02B 6/36* (2013.01); *G09F 13/18* (2013.01); *G09F 23/00* (2013.01); *G09F 23/0058* (2013.01)

(58) Field of Classification Search
CPC ........... G02B 6/36; G09F 13/18; G09F 23/00; G09F 23/0058
USPC ........................................................ 385/92
See application file for complete search history.

(56) References Cited

U.S. PATENT DOCUMENTS

| | | | | |
|---|---|---|---|---|
| 5,462,700 | A * | 10/1995 | Beeson | B29D 11/00663 264/1.27 |
| 2012/0298492 | A1 | 11/2012 | Meyer | |
| 2015/0153510 | A1* | 6/2015 | Ohara | G02B 6/08 385/123 |

FOREIGN PATENT DOCUMENTS

| | | |
|---|---|---|
| EP | 2 085 800 A1 | 8/2009 |
| JP | 2011154230 A | 8/2011 |
| WO | WO 2011/144484 A1 | 11/2011 |

OTHER PUBLICATIONS

SIEMENS AG, SIMATIC, Dezentrale Peripherie, Dezentrales Peripheriegerät ET 200eco, Mar. 2013, A5E00158714-03, instruction book, pp. 1-124; 2013; DE; Mar. 1, 2013.

* cited by examiner

*Primary Examiner* — Jerry Blevins
(74) *Attorney, Agent, or Firm* — Cozen O'Connor

(57) ABSTRACT

A display element for an electronic module configured as an optical waveguide arrangement is provided. The display element includes a first optical waveguide part with a first light-receiving surface and a first light-emitting surface. The display element further includes a second optical waveguide part with a second light-receiving surface and a second light-emitting surface. The first optical waveguide part and the second optical waveguide part are arranged opposite one another. A first guide is arranged on an inner side of the first optical waveguide part and a second guide is arranged on an inner side of the second optical waveguide part. The respective inner sides are arranged in relation to one another such that the designation label is configured to be fastened by the first and second guide.

5 Claims, 3 Drawing Sheets

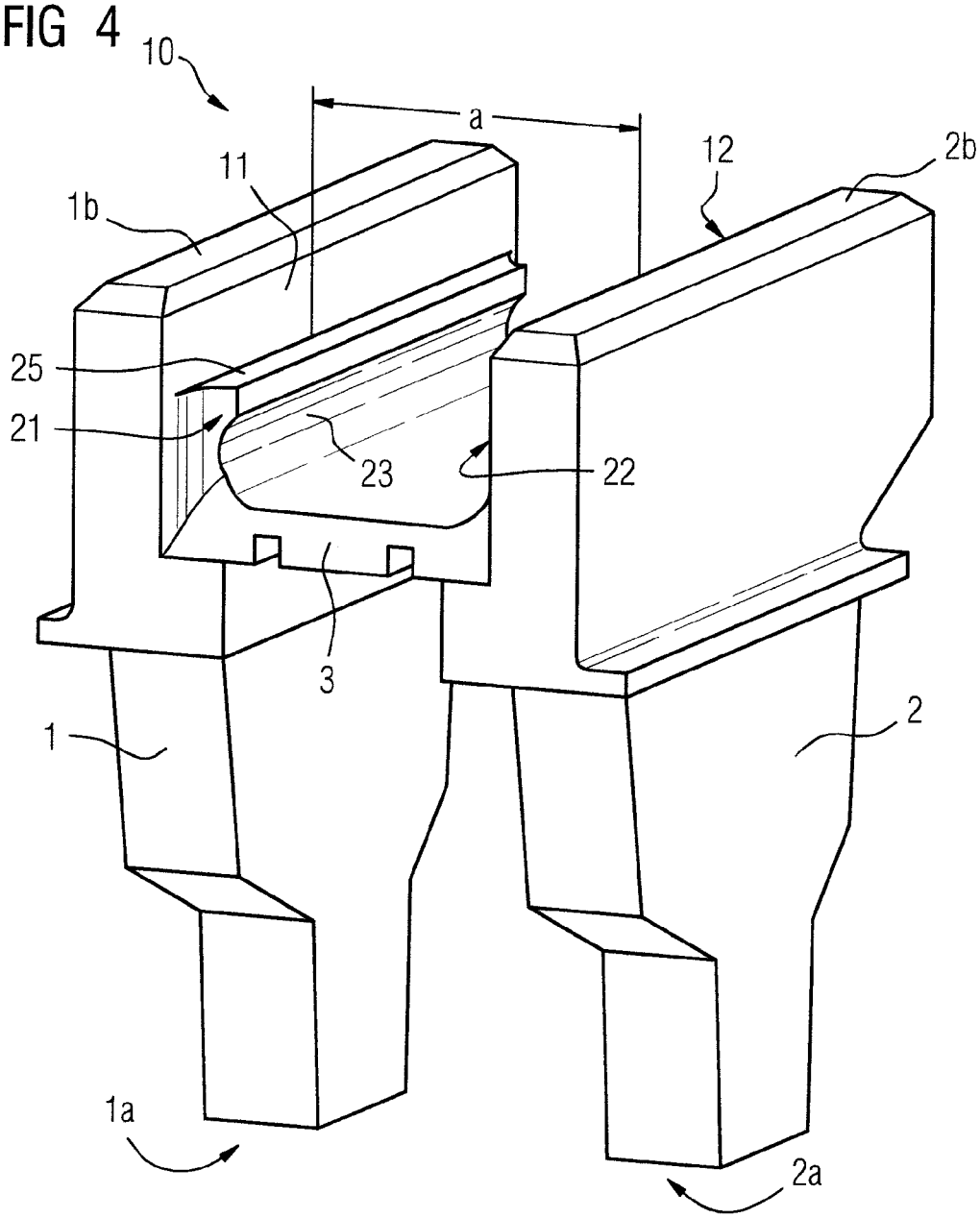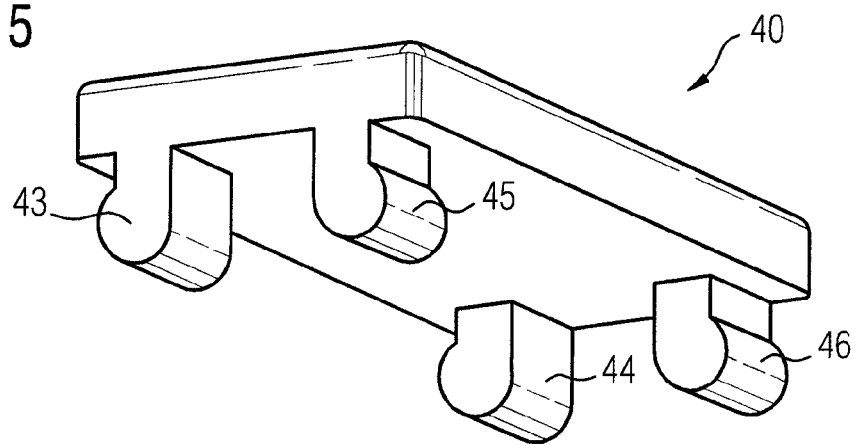

DISPLAY ELEMENT FOR AN ELECTRONIC MODULE AND ELECTRONIC MODULE

BACKGROUND OF THE INVENTION

1. Field of the Invention

The application generally relates to a display element for an electronic module configured as an optical waveguide arrangement. In one aspect, the optical waveguide comprises a first optical waveguide part with a first light-receiving surface and a first light-emitting surface and a second optical waveguide part with a second light-receiving surface and a second light-emitting surface. The first optical waveguide part and the second optical waveguide part are arranged opposite one another. The application also generally relates to an electronic module with a housing and to a recess wherein the display element is coupled.

2. Related Art

In electronic modules, especially in electronic modules for industrial process automation, options are provided for a user of the electronic module to label or to identify the respective electronic module as well as interfaces disposed on the electronic module. For electronic modules with an increased protection type (e.g. IP 65/IP 67) designation labels are realized by plastic labels that the user of the electronic module can inscribe individually and subsequently install at or on the electronic module.

In the manual entitled *Siemens, SIMATIC, Dezentrale Peripherie, Dezentrales Peripheriegerät* (decentralized periphery, decentralized peripheral device), ET 200eco, 03/2013, A5E00158714-03, an electronic module is presented as a decentralized peripheral device for industrial process automation, particularly for communication. Typically, such electronic peripheral devices include a number of channels or interfaces per device, wherein a designation label is provided in each case for the channels. The designation labels are latched into the housing surface of the device at a provided position. To that end, an undercut is necessary at the respective location in the housing surface, into which the designation label can latch. Attaching and placing the designation labels on devices with a high protection type (IP 65/IP 67) continues to present a problem since moisture may not penetrate into the device.

Previously, the designation labels have been latched directly into the relevant housing of the device. To that end, the required undercut is created in two ways: For metal housings that have been manufactured in a die casting method, the undercut is inserted by subsequent mechanical processing.

For plastic housings that have been manufactured in an injection molding method, in one example, the undercut is manufactured (i.e., as a result of the small undercut) either by a more simply structured inner slider or by a forced demolding. It is not possible to demold the undercut from the inside since this means that the protection type is no longer guaranteed.

SUMMARY OF THE INVENTION

It is an object of the present disclosure to provide a display element with a designation label for an electronic module, wherein manufacturing is simplified while providing guaranteed protection against water spray or temporary submersion.

In one aspect there is a display element for an electronic module, wherein the display element is embodied as an optical waveguide arrangement comprising a first optical waveguide part with a first light-receiving surface and a first light-emitting surface, a second optical waveguide part with a second light-receiving surface and a second light-emitting surface. The first optical waveguide part and the second optical waveguide part are arranged opposite one another. A first guide is arranged on an inner side of the first optical waveguide part and a second guide is arranged on an inner side of the second optical waveguide part. The respective inner sides are arranged in relation each other such that a designation label is able to be attached by the first and the second guide. Generally, optical waveguides are present on the electronic modules involved or in the industrial peripheral devices that carry the displays, especially for LEDs that are arranged on a printed circuit board, to the outside. For electronic modules with a higher protection type (IP 65/IP 67) the optical waveguides are pressed in for metal housings or insert-molded for plastic housings. In insert molding, a multicomponent or two-component injection molding method may be used, wherein a 2K part is produced. The optical waveguides to be insert-molded are mostly produced separately (i.e., in a separate prior production step). Accordingly, the design scope for the molding of the optical waveguide arrangement (e.g., of the display element) is greater.

In one embodiment, a display element is provided, which facilitates the integration of an attachment point for the designation label into the optical waveguide arrangement. In another embodiment related to an injection molding method, the undercut for latching on the designation label can be created on the optical fiber arrangement in the demolding direction. Thus, such creation is more simple than in the actual housing. In one embodiment, the protection (IP 65/IP 67), (e.g., for sealing against temporary submersion) is guaranteed, since the optical waveguide arrangement with the integrated attachment point for the designation label can be pressed into or insert-molded into the housing of the electronic module.

In one embodiment, the guide embodied as an attachment point is configured as a slot that extends lengthwise along the inner side. It should be noted that it is advantageous for a contact edge for the designation label to run on the inner side.

Regarding the plastic injection molded part for the optical waveguide arrangement, it is advantageous for the first optical waveguide part and the second optical waveguide part to be connected to a central part and for the optical waveguide arrangement to be configured as a single plastic part.

In one embodiment, to obtain the required protection type, the display element is configured such that it is placed in a recess of the housing of the electronic module, so that the recess is sealed by the optical waveguide arrangement.

In one embodiment, the first optical waveguide part is arranged with its first light-receiving surface above a first light source and the second optical waveguide part is arranged with its second light-receiving surface above a second light source inside the housing, wherein the recess and the display element are joined together such that the inside of the housing at the installation location of the display element is protected against water spray or temporary submersion.

BRIEF DESCRIPTION OF THE DRAWINGS

The properties, features and advantages that are described above and also the manner in which they are achieved will become clearer and more distinctly comprehensible in connection with the description that follows for the exemplary embodiments, which are explained in more detail in connection with the drawings, in which:

FIG. 4 illustrates a three-dimensional diagram of the display element, and FIG. 5 illustrates a three-dimensional diagram of a designation label.

DETAILED DESCRIPTION OF THE PRESENTLY PREFERRED EMBODIMENTS

Figure 1:
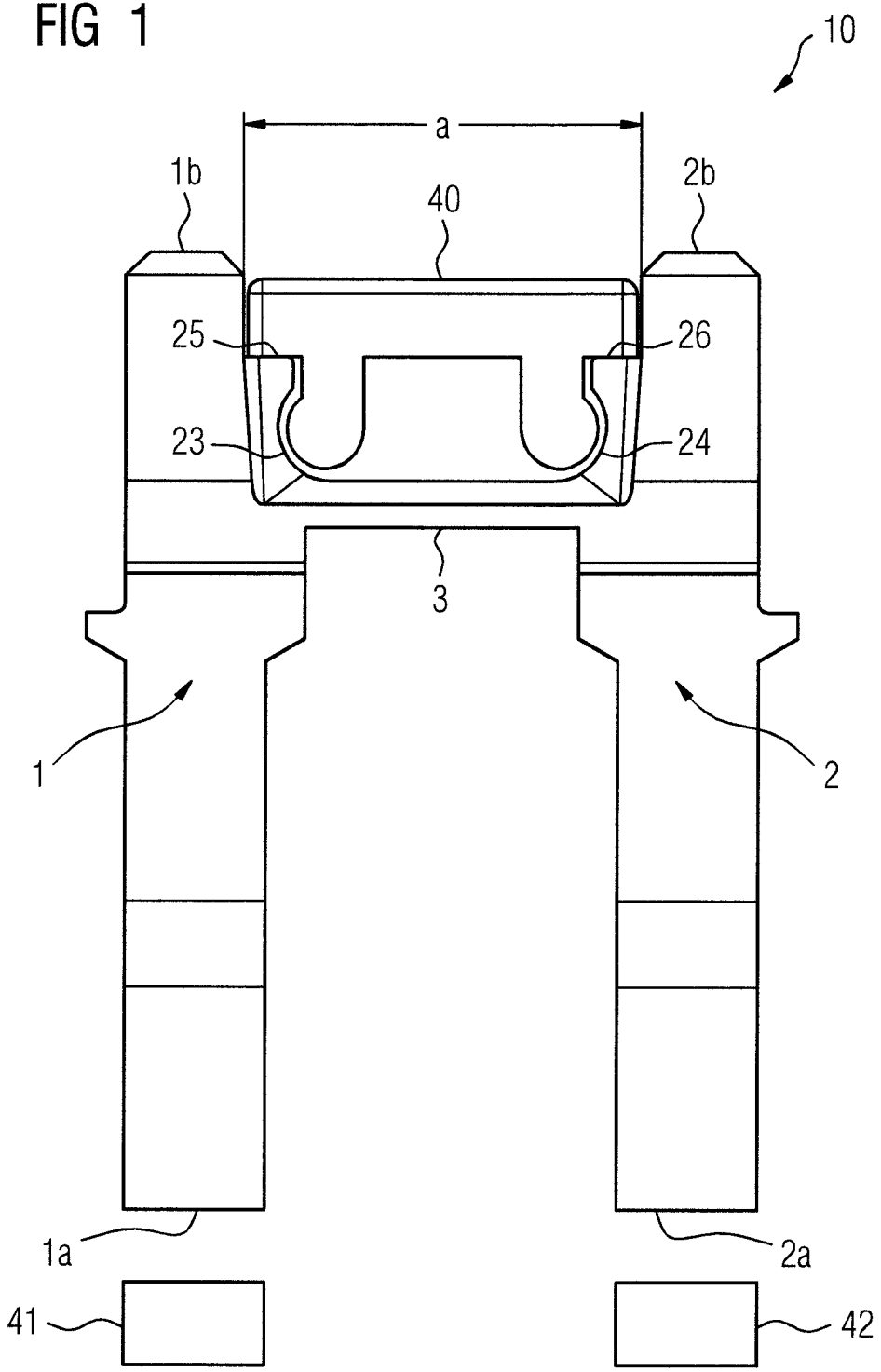
FIG. 1 illustrates a display element with designation label in a sectional diagram.

FIG. 1 illustrates a display element 10 for an electronic module 20. The display element 10 is an optical waveguide arrangement, comprising a first optical waveguide part 1 with a first light-receiving surface 1a and a first light-emitting surface 1b, a second optical waveguide part 2 with a second light-receiving surface 2a and a second light-emitting surface 2b. The first optical waveguide part 1 and the second optical waveguide part 2 are arranged in parallel, at a distance a from one another.

The display element 10 is discussed in the context of FIG. 1 and FIG. 4. The first guide 21 is arranged on an inner side 11 of the first optical waveguide part 1. The second waveguide is arranged on an inner side 12 of the second optical waveguide part 2. The respective inner sides 11, 12 are arranged in relation to one another such that a designation label 40 is configured to be fastened by the first and second guides 21, 22. In one embodiment, the first guide 21 is configured as a slot 23 extending along the inner side 11 parallel to the light-emitting surface 1b. Similarly, the second guide is configured as a slot 24 extending along the inner side 12 parallel to the light-emitting surface 2b. The designation label can be latched from above into such an arrangement of slots extending lengthwise within the optical waveguide arrangement by applying light pressure.

Since status indicators (e.g. LEDs) and designation labels have previously been arranged separately, the result achieved with the display element 10 is a simplified manufacturing process of the electronic module 20. Further, space is saved on the front of the electronic module 20. The first light-emitting surface 1b and the second light-emitting surface 2b serve as the actual displays for a first light source 41 and a second light source 42 arranged within the optical waveguide arrangement. The first light source 41 radiates its transmitted light onto the first light-emitting surface 1a and the second light source 42 radiates its light onto the second light-emitting surface 2a.

Figure 2:
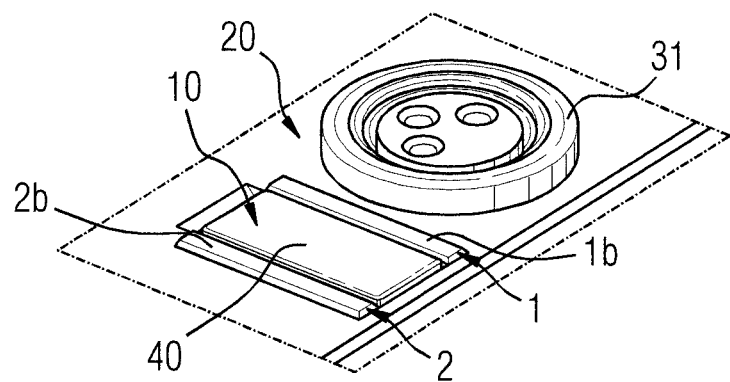
FIG. 2 illustrates a perspective section from an electronic module with a display element.

FIG. 2 illustrates a section in a perspective view from an electronic module 20. In the housing 20 the display element 10 is arranged below the interface 31. The designation label 40 is arranged between the first optical waveguide part 1 and the second optical waveguide part 2. In this regard, an improved assignment of the designation label to the corresponding channel status display of the interface 31 is achieved. Furthermore, a two-channel status display can be uniquely assigned to the designation label through the first optical waveguide part 1 and the second optical waveguide part 2.

Figure 3:
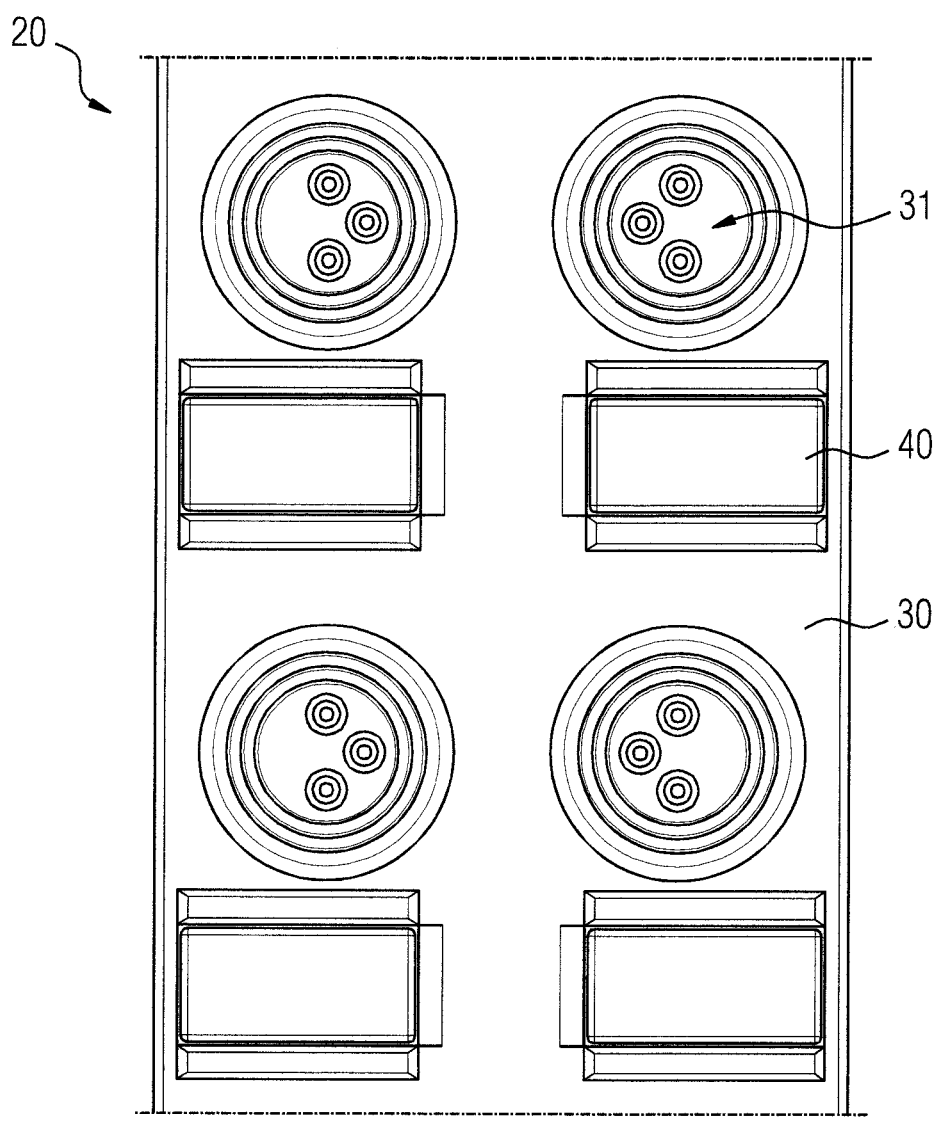
FIG. 3 illustrates a view from above of an electronic module with a number of display elements and a number of associated interfaces.

Particularly for electronic modules of the decentralized periphery for process automation, the electronic module 20 bears a number of interfaces. For each interface 31, a display element 10 with a designation label 40 is assigned, respectively, as illustrated in FIG. 3.

FIG. 4 illustrates the display element 10 in a three-dimensional diagram as a plastic injection molded part. The first optical waveguide part 1 and the second optical waveguide part 2 are connected to each other by a central part 3. The central part 3 has additional longitudinal rib corrugations on its underside, which (for an integration into the housing by an injection molding method) improves the adhesion of the display element to a part of a housing surface. When the display element 10 is used in accordance with FIG. 4, two recesses are provided in a housing, through which the limbs of the first optical waveguide 1 and the second optical waveguide 2 are pushed. The central part 3 thus rests against a part of the housing surface.

FIG. 5 illustrates a designation label 40 for latching into the first guide 21 and the second guide 22 of the display element 10. For secure latching-in of the designation label 40 into the guide 21, 22 configured as slots, the designation label has a first latch 43, a second latch 44, a third latch 45, and a fourth latch 46. The latches 43, 44, 45, 46 are each configured as feet that have a molded shape that exactly fit into the longitudinal slot of the guide 21, 22.

While there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A display element for an electronic module configured as an optical waveguide, comprising:
    a first optical waveguide part having a first light-receiving surface and a first light-emitting surface;
    a second optical waveguide part having a second light-receiving surface and a second light-emitting surface;
    a first guide arranged on an inner side of the first optical waveguide part; and
    a second guide arranged on an inner side of the second optical waveguide part, the respective inner sides being arranged in relation to one another such that a designation label is configured to be fastened by the first and second guides;
    wherein the first optical waveguide part and the second optical waveguide part are arranged opposite one another; and
    wherein:
        the display module is configured to be placed in a recess of an electronic module having a housing;
        the first optical waveguide part with its first light-receiving surface is arranged over a first light source and the second optical waveguide part with its second light-receiving surface is arranged over a second light source within the housing; and
        the recess and the display element are configured to be joined together such that the inside of the housing, at the installation location of the display element, is protected from at least one of splash water and temporary submersion.

2. The display element of claim 1, wherein at least one guide is configured as a slot extending lengthwise along the inner side.

3. The display element of claim 1, wherein a contact edge for the designation label is on the inner sides.

4. The display element of claim 1, wherein:
   the first optical waveguide part and the second optical waveguide part are connected to a central part; and
   an optical waveguide arrangement is configured as one plastic part.

5. The display element of claim 4, wherein the display element is configured to be placed in a recess of a housing of the electronic module such that the recess is sealed by the optical waveguide arrangement.

* * * * *